United States Patent
Iyigun et al.

(10) Patent No.: US 8,832,411 B2
(45) Date of Patent: Sep. 9, 2014

(54) WORKING SET SWAPPING USING A SEQUENTIALLY ORDERED SWAP FILE

(75) Inventors: Mehmet Iyigun, Kirkland, WA (US); Yevgeniy Bak, Redmond, WA (US); Landy Wang, Kirkland, WA (US); Arun U. Kishan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 165 days.

(21) Appl. No.: 13/326,182

(22) Filed: Dec. 14, 2011

(65) Prior Publication Data
US 2013/0159662 A1    Jun. 20, 2013

(51) Int. Cl.
*G06F 12/02* (2006.01)

(52) U.S. Cl.
CPC ....................................... *G06F 12/02* (2013.01)
USPC ......................................................... 711/203

(58) Field of Classification Search
USPC ................................................. 711/118, 203
See application file for complete search history.

(56) References Cited

U.S. PATENT DOCUMENTS

| | | | |
|---|---|---|---|
| 5,101,485 A | 3/1992 | Perazzoli, Jr. | |
| 5,125,086 A | 6/1992 | Perazzoli, Jr. | |
| 5,247,687 A | 9/1993 | Eilert et al. | |
| 5,388,242 A | 2/1995 | Jewett | |
| 5,517,643 A * | 5/1996 | Davy | 718/105 |
| 5,594,881 A | 1/1997 | Fecteau et al. | |
| 5,628,023 A * | 5/1997 | Bryant et al. | 711/207 |
| 5,802,599 A | 9/1998 | Cabrera et al. | |
| 5,826,057 A | 10/1998 | Okamoto et al. | |
| 5,966,735 A * | 10/1999 | Noel et al. | 711/206 |
| 6,128,713 A | 10/2000 | Eisler et al. | |
| 6,442,664 B1 * | 8/2002 | Maynard et al. | 711/203 |
| 6,496,909 B1 | 12/2002 | Schimmel | |
| 6,496,912 B1 | 12/2002 | Fields, Jr. et al. | |
| 6,681,239 B1 | 1/2004 | Munroe et al. | |
| 7,197,590 B2 * | 3/2007 | Chiu | 710/305 |
| 7,437,529 B2 | 10/2008 | Burugula et al. | |
| 7,475,183 B2 | 1/2009 | Traut et al. | |
| 7,610,437 B2 * | 10/2009 | Sinclair et al. | 711/103 |
| 7,624,240 B1 | 11/2009 | Colbert et al. | |

(Continued)

FOREIGN PATENT DOCUMENTS

KR     1020110085989     7/2011
KR     101221241(B1 S    5/2013

OTHER PUBLICATIONS

Azimi et al, "PATH: Page Access Tracking to Improve Memory Management", Proc. 6th Intl Symposium on Memory Management, Oct. 2007, 10 pgs.

(Continued)

*Primary Examiner* — Hiep Nguyen
(74) *Attorney, Agent, or Firm* — John Jardine; Kate Drakos; Micky Minhas

(57) ABSTRACT

Techniques described enable efficient swapping of memory pages to and from a working set of pages for a process through the use of large writes and reads of pages to and from sequentially ordered locations in secondary storage. When writing pages from a working set of a process into secondary storage, the pages may be written into reserved, contiguous locations in a dedicated swap file according to a virtual address order or other order. Such writing into sequentially ordered locations enables reading in of clusters of pages in large, sequential blocks of memory, providing for more efficient read operations to return pages to physical memory.

20 Claims, 7 Drawing Sheets

(56) References Cited

U.S. PATENT DOCUMENTS

| | | |
|---|---|---|
| 7,797,510 B1 | 9/2010 | Case et al. |
| 2003/0037060 A1* | 2/2003 | Kuehnel ................... 707/103 R |
| 2006/0161912 A1* | 7/2006 | Barrs et al. ................... 717/170 |
| 2007/0156386 A1* | 7/2007 | Guenthner et al. ............. 703/26 |
| 2011/0153978 A1 | 6/2011 | Chalemin et al. |
| 2012/0151127 A1* | 6/2012 | Lim ............................. 711/103 |
| 2012/0233438 A1 | 9/2012 | Bak et al. |

OTHER PUBLICATIONS

"HP OpenVMS System Services Reference Manual", retrieved Dec. 1, 2011 from http://h71000.www7.hp.com/doc/83final/4527/4527pro_022.html, 7 pgs.

Microsoft, "Working Set", Retrieved on: Dec. 5, 2011, Available at: http://msdn.microsoft.com/en-us/library/windows/desktop/cc441804(d=printer,v=vs.85), 2 pgs.

Office action for U.S. Appl. No. 13/042,128, mailed on Nov. 21, 2013, Bak, et al., "Pagefile Reservations", 15 pages.

Non-Final Office Action for U.S. Appl. No. 13/042,128, mailed on Apr. 3, 2013, Yevegeniy M. Bak et al., "Pagefile Reservations", 12 pages.

PCT Search Report for PCT Application No. PCT/US2012/069602, mailed May 30, 2013 (10 pages).

Clark et al., "Selective Page Updating", IP.com Prior Art Database Technical Disclosure, 1987, 3 pages.

Jenner et al., "Address Space Suballocation in a Virtual Storage Environment", IP.com Prior Art Database Technical Disclosure, 1973, 6 pages.

Office action for U.S. Appl. No. 13/042,128, mailed on May 2, 2014, Bak et al., "Pagefile Reservations", 13 pages.

\* cited by examiner

WORKING SET SWAPPING USING A SEQUENTIALLY ORDERED SWAP FILE

BACKGROUND

Computing systems employ main memory (often referred to as physical memory) to execute processes including software programs or applications. In modern systems, this main memory generally includes volatile memory such as random access memory (RAM). The operating system (OS) may assign to each process a number of pages of memory to use while the process is executing in physical memory. However, active processes may use more physical memory than is available on the system. In such cases, virtual memory may be employed to supplement the physical memory used by active processes, instead of maintaining all of the process pages in physical memory.

Virtual memory may be implemented by writing one or more pages for a process to non-volatile memory in secondary storage (e.g., a hard drive), and reading the pages back into physical memory as needed. For example, when data is not being actively used by a process the pages containing such data may be written to secondary storage thus freeing space in physical memory. This process of reading and writing pages between physical memory and virtual memory is generally referred to as paging, and the space in secondary storage for writing pages is generally referred to as a pagefile. The speed and efficiency at which this paging occurs for a process may impact system performance and user experience.

SUMMARY

Traditional paging operations tend to page out individual pages from physical memory into secondary storage based on the memory requirements of currently active processes, and this may lead to fragmentation of the secondary storage. This application describes techniques for efficiently swapping one or more pages to and from a working set of pages for a process, through the use of large writes and reads of pages to and from sequentially ordered locations in secondary storage. Because reads and writes tend to be more efficient in cases when they can be performed on sequentially ordered and/or larger blocks of memory, the techniques described herein employ large reads and writes of pages to and from sequentially ordered locations in physical memory during swapping operations. When swapping pages out of physical memory into secondary storage, pages may be written into reserved, contiguous locations in a dedicated swap file according to their virtual address order. Such writing may enable swapping in of pages in large, sequentially ordered blocks of memory, providing for a more efficient inswapping.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1A:
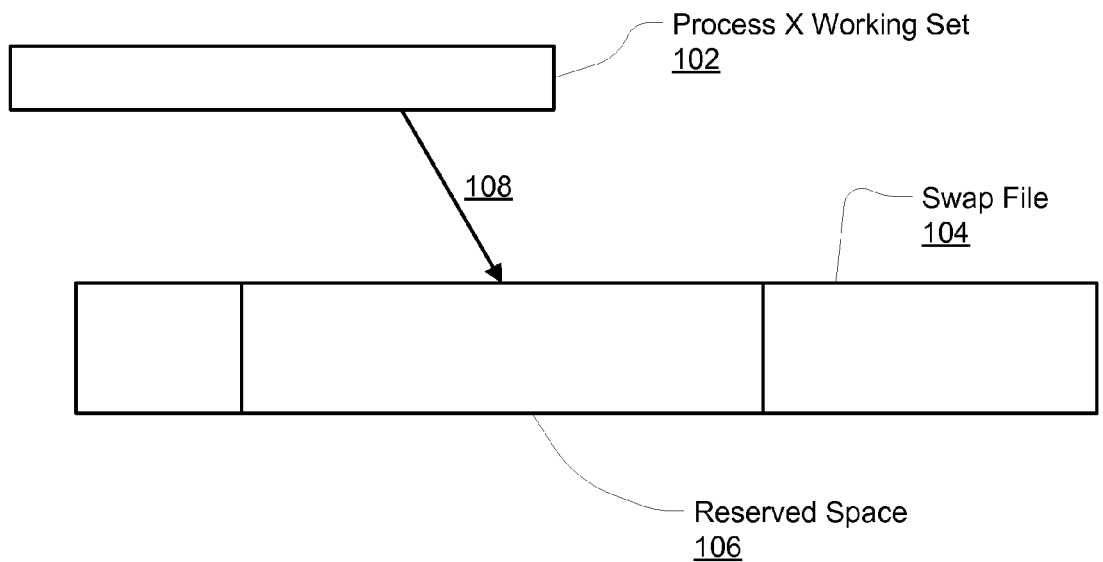
FIGS. 1A and 1B illustrate an example for writing of pages from a working set of a process into sequentially ordered locations of a swap file, in accordance with embodiments.

Embodiments described herein enable more efficient swapping of memory pages from the working set of a process through the use of writes and reads of large blocks of memory to and from sequentially ordered locations in secondary storage. Processes executing in physical memory such as random access memory (RAM) may require more physical memory that is available on the system. In such cases, a traditionally configured memory manager or other component of the operating system may implement paging operations to free up some physical memory by writing one or more memory pages for a process into a pagefile on secondary storage. In traditional paging, individual pages of a process may be written (i.e., paged out) to free physical memory as it is needed, and pages may be paged back into physical memory on demand when a process wishes to access them (e.g., when a page fault occurs). Such traditional paging of individual pages as needed is often referred to as demand paging, and may lead to secondary storage input/output (I/O) operations that are random and small, with various pages stored in non-contiguous storage space and not in any particular order.

Moreover, I/O operations (e.g., reads and writes) in computing systems are generally more efficient when performed in sequentially ordered and large requests. For example, in systems that employ solid state disks, I/O operations that are sequentially ordered may lead to efficiency gains of a factor of two to three compared to requests to random locations. In many cases, larger sized sequential requests may yield similar gains compared to smaller sized sequential requests. Moreover, in systems that employ rotational disks, the efficiency gain may be as large as fifty-fold. Given that, embodiments described herein enable efficient swapping through use of I/O operations for reading and writing larger clusters of pages to and from sequentially ordered locations in a swap file.

As used herein, the term page may refer to a block of memory used by a process while it is executing. When the process is active, a page may be in physical memory where it is accessible to the process. A memory manager or other component of an operating system (OS) may remove one or more pages out of physical memory and write them to secondary storage. Pages may be read back into physical memory by copying them back from secondary storage.

In one or more embodiments, pages may include private pages for a process. As used herein, private pages may refer to those pages that are owned by or dedicated to a particular process and used by no other process, such as a heap allocated for the process. Other types of pages may include shareable pages that are used by multiple processes, such as a file mapping. Some embodiments support efficient swapping of private pages. Moreover, some embodiments may also support swapping of pagefile-backed shared pages. These types of pages may be stored in a single location (e.g., in a pagefile), and may be referenced by a handle or pointer. A process may pass a handle such a pagefile-backed shared page to another process, and the page may persist in memory so long as a process maintains a handle to it.

As used herein, the term working set may refer to a set of pages for a process. Embodiments support various types of working sets. For example, a working set may include pages for the data that is accessed and/or referenced by a process during a particular time interval. Such a working set may provide an approximation for a set of pages likely to be accessed by the process in the near future (e.g., during a next period of time) such that it may be desirable to keep the pages in physical memory for ready access by the process. However, embodiments are not so limited and may support other types of collections of pages as a working set. For example, a working set for a process may be those pages that are accessible directly from a processor without going through the OS.

As used herein, the term swap file may refer to space reserved on secondary storage (e.g., a hard drive) and used for swapping pages into or out of physical memory. In some embodiments, the swap file is a dedicated swap file that is separate from the pagefile used for traditional paging operations. In some embodiments, the swap file may be part of the pagefile. In some embodiments, the swap file may be initialized by a memory manager or other OS component and its size may be dynamically managed as described herein with regard to FIG. 6.

Figure 1B:
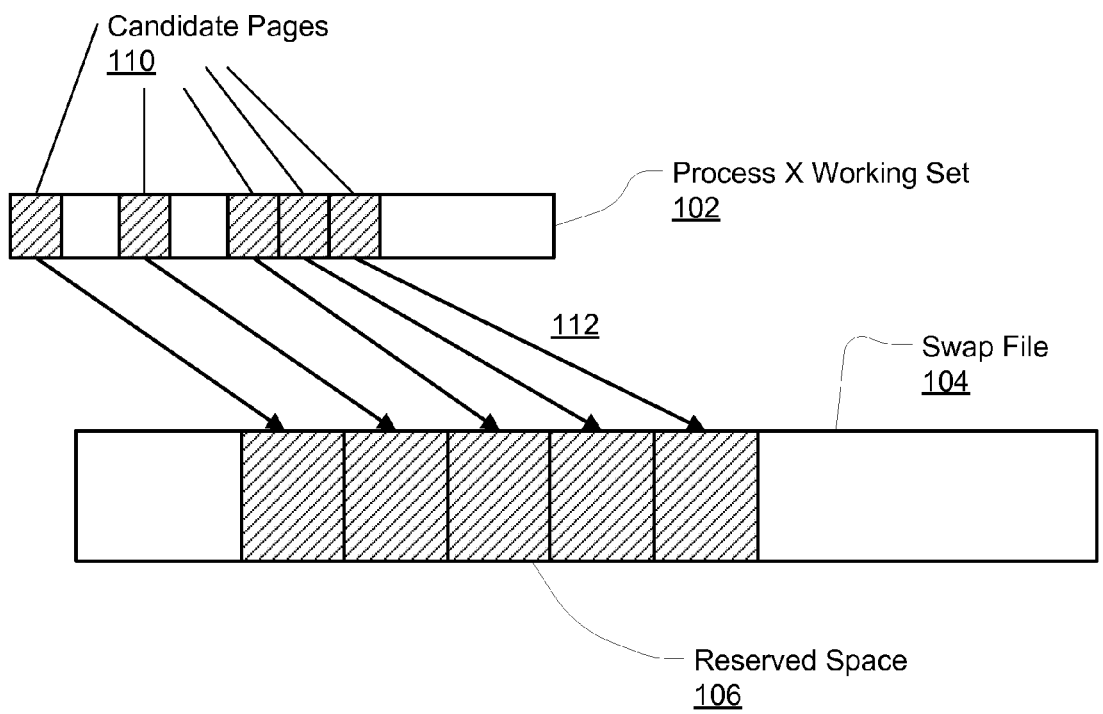

Embodiments provide for outswapping of pages from a working set for a process, and for writing one or more swapped out pages from the working set to the swap file in secondary storage. As discussed above, embodiments enable efficient swapping by providing for reads and/or writes of pages in large clusters to and from sequentially ordered locations in a swap file. FIGS. 1A and 1B illustrate an example of outswapping and writing for one or more embodiments.

FIG. 1A shows a working set 102 of a particular process, Process X, and a swap file 104 in secondary storage. A determination may be made to swap out one or more pages of working set 102 from physical memory. An OS component such as a memory manager may then identify one or more pages of the working set 102 that are candidate pages for swapping out, such as the private pages of the working set. The total size of the identified candidate pages may be calculated. Then, reserved space 106 may be reserved in swap file 104 in an operation 108, the reserved space sufficient to store the candidate pages. Further, a location for each candidate page may be reserved in the reserved space 106, the locations sequentially ordered according to the virtual address order of the candidate pages. At this point, in some embodiments the candidate pages may be said to have been swapped out even though no candidate pages have been written to the swap file.

FIG. 1B depicts the one or more candidate pages 110 in working set 102. In one or more write operations 112, one or more of the candidate pages 110 are written to reserved space 106. As shown in FIG. 1B, each written candidate page may be written to its particular reserved location. In some embodiments although the candidate pages 110 may be non-contiguous in the working set they are written into contiguous locations in the swap file, as shown in FIG. 1B. The writing of candidate pages into a contiguous, sequentially ordered, reserved space 106 may enable a subsequent read operation to read a large, sequentially ordered block of the swap file when the pages are read back into working set 102 during subsequent inswapping operations. Thus, in some embodiments the writing of the candidate pages into sequentially ordered locations in the swap file enables an efficient, future read that is large and/or sequentially ordered. Outswapping and writing of pages is described in more detail with regard to FIG. 4. Embodiments further provide for the inswapping of pages including the reading of pages from the swap file into the working set (i.e., returning the pages to physical memory for use by the process). Inswapping of pages is described in more detail with regard to FIG. 5.

In some embodiments, the decision to swap out and remove one or more pages from the working set of a process may be made by a policy manager or other component of the OS, based on various conditions. For example, a determination may be made that a process is suspended, inactive, or for some reason less active (e.g., accessing fewer pages) than other active processes on the computing device. In such cases, some or all of the working set for the process may be removed from the working set to free more physical memory for use by other processes. However, to create a smooth user experience it may be desirable to read pages back into the working set as efficiently as possible during inswapping, so that the process becomes active quickly. Efficient swapping in through use of large and/or sequential I/O operations may enable fast reactivation of a process and therefore provide for enhanced performance in a computing device switching between active processes.

Illustrative Computing Device Architecture

Figure 2:
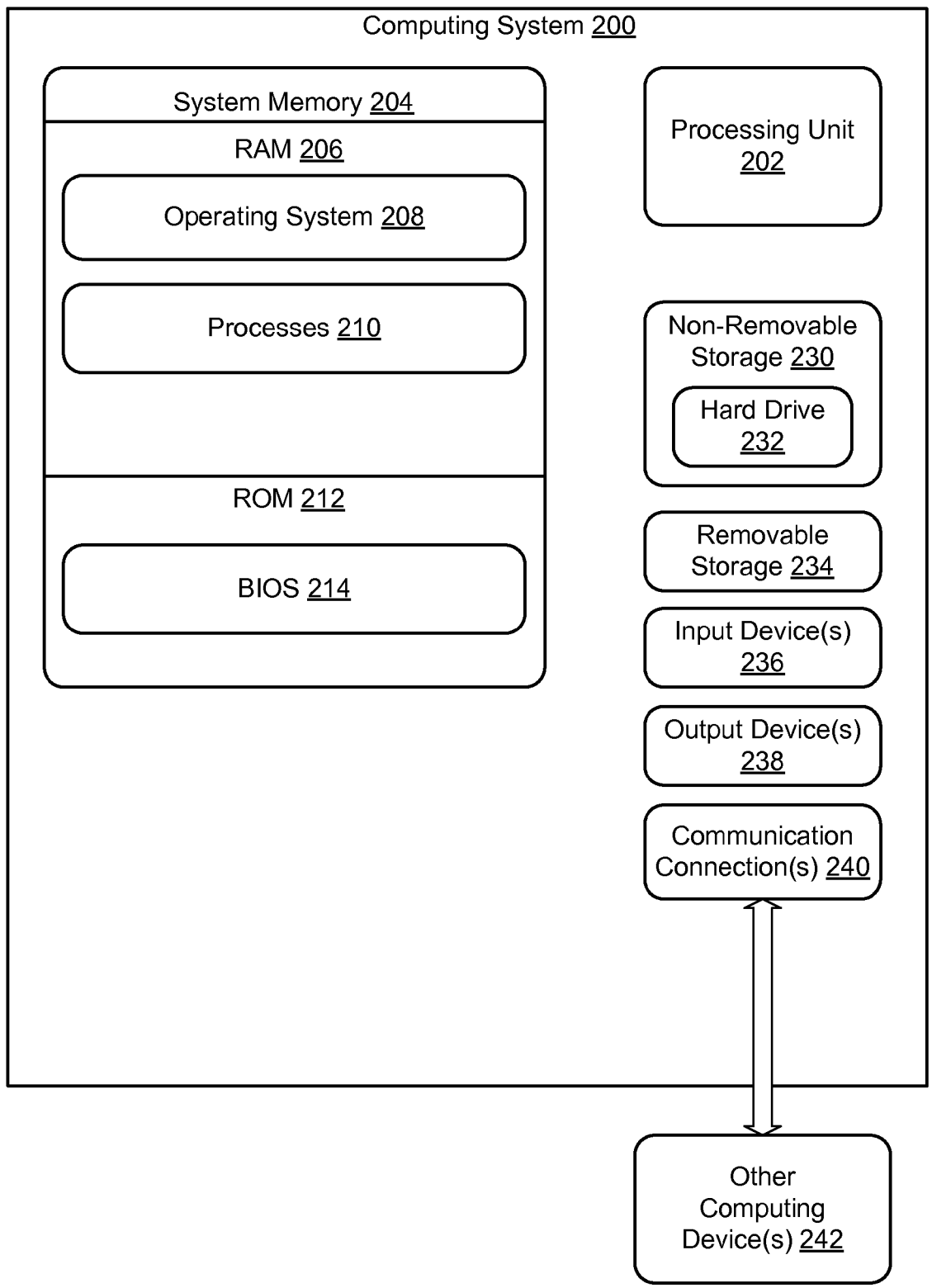
FIG. 2 is a schematic diagram depicting an example computing system, in accordance with embodiments.

FIG. 2 depicts a diagram for an example computer system architecture in which embodiments may operate. As shown, computing system 200 includes processing unit 202. Processing unit 202 may encompass multiple processing units, and may be implemented as hardware, software, or some combination thereof. Processing unit 202 may include one or more processors. As used herein, processor refers to a hardware component. Processing unit 202 may include computer-executable, processor-executable, and/or machine-executable instructions written in any suitable programming language to perform various functions described herein.

Computing device 200 further includes a system memory 204, which may include volatile memory such as random access memory (RAM) 206, static random access memory (SRAM), dynamic random access memory (DRAM), and the like. RAM 206 includes one or more executing OS 208, and one or more executing processes 210, including components, programs, or applications that are loadable and executable by processing unit 202. Thus, in some embodiments RAM 206 may include the physical memory in which an OS 208 or processes 210 execute.

System memory 204 may further include non-volatile memory such as read only memory (ROM) 212, flash memory, and the like. As shown, ROM 212 may include a Basic Input/Output System (BIOS) 214 used to boot computing system 200. Though not shown, system memory 204 may further store program or component data that is generated and/or employed by operating system(s) 208 and/or processes 210 during their execution. System memory 204 may also include cache memory.

As shown in FIG. 2, computing device 200 may also include non-removable storage 230 and/or removable storage 234, including but not limited to magnetic disk storage, optical disk storage, tape storage, and the like. Disk drives and associated computer-readable media may provide non-volatile storage of computer readable instructions, data structures, program modules, and other data for operation of computing system 200. Moreover, non-removable storage 230 may further include a hard drive 232. In some embodiments, hard drive 232 may provide secondary storage for use in the swapping operations described herein.

In general, computer-readable media includes computer storage media and communications media.

Computer storage media includes volatile and non-volatile, removable and non-removable media implemented in any method or technology for storage of information such as computer readable instructions, data structure, program modules, and other data. Computer storage media includes, but is not limited to, RAM, ROM, erasable programmable read-only memory (EEPROM), SRAM, DRAM, flash memory or other memory technology, compact disc read-only memory (CD-ROM), digital versatile disks (DVDs) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave or other transmission mechanism. As defined herein, computer storage media does not include communication media.

Computing system 200 may include input device(s) 236, including but not limited to a keyboard, a mouse, a pen, a game controller, a voice input device for speech recognition, a touch input device, and the like. Computing system 200 may further include output device(s) 238 including but not limited to a display, a printer, audio speakers, a haptic output, and the like. Computing system 200 may further include communications connection(s) 240 that allow computing system 200 to communicate with other computing devices 242 including client devices, server devices, databases, and/or other networked devices available over one or more communication networks.

Figure 3:
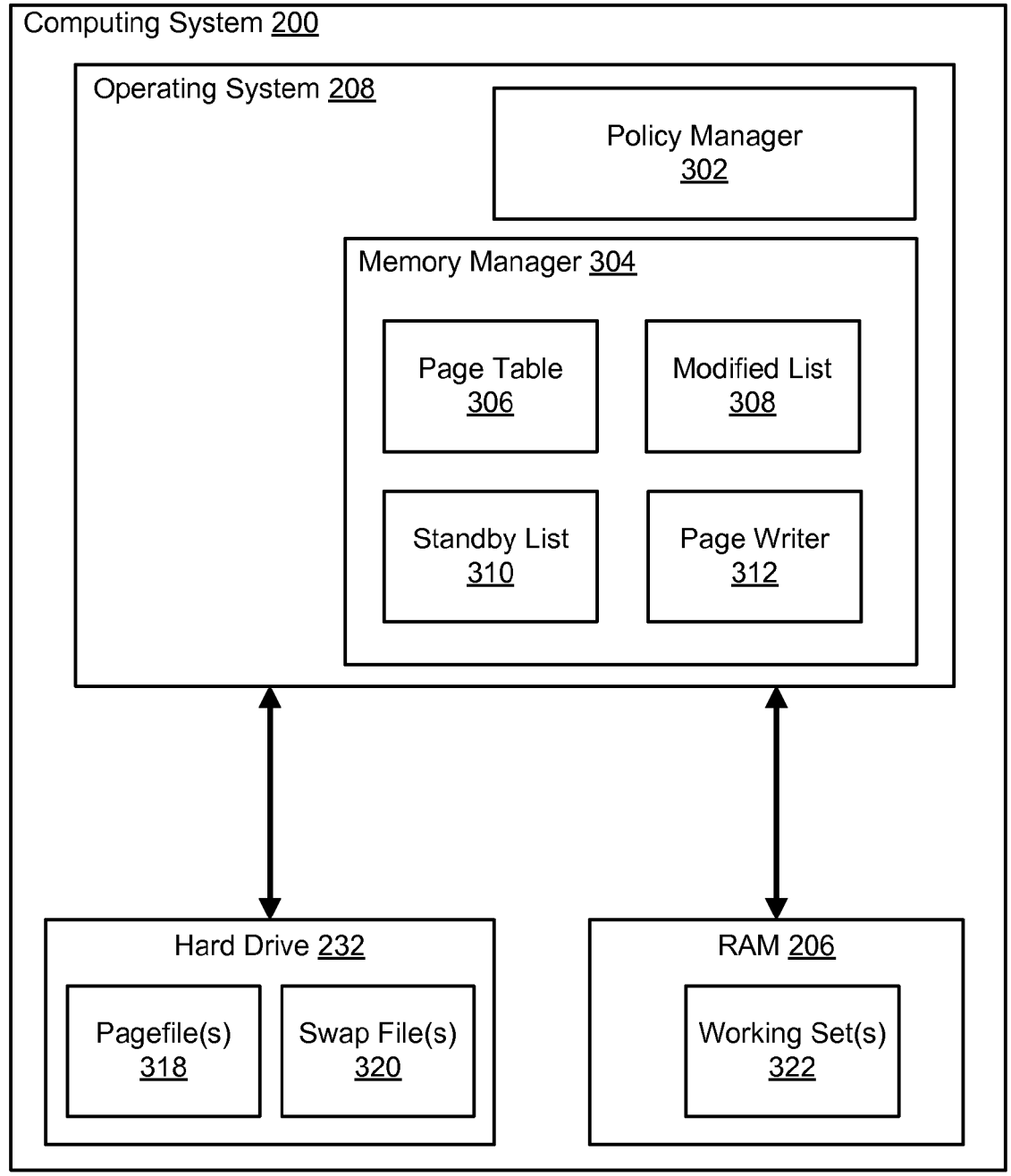
FIG. 3 is a schematic diagram of example operating system components, in accordance with embodiments.

FIG. 3 provides an example depiction of computing system 200 and OS 208, according to embodiments. As shown, in some embodiments OS 208 includes one or more components such as policy manager 302 and memory manager 304. In some embodiments, policy manager 302 determines when pages are to be swapped out of or swapped into a working set for a process executing in physical memory of computing system 200. In some embodiments, policy manager 304 may be described as a process lifetime manager for OS 208 that decides when processes are to be suspended, reactivated, and/or terminated under various conditions.

As shown in FIG. 3, OS 208 may communicate with hard drive 232 and RAM 206, for example through a communications bus of computing system 200. Hard drive 232 may include secondary storage for use by OS 208 in paging or swapping operations. In some embodiments, hard drive 232 includes one or more pagefiles 318 and/or one or more swap files 320. In some embodiments, pagefile(s) 318 and/or swap file(s) 320 are initialized by memory manager 304 for use in paging or swapping operations. In the example shown, swap file(s) 320 are separate from pagefile(s) 318. However, in some embodiments swap file(s) 320 may be part of pagefile(s) 318. RAM 206 may include physical memory in which processes execute, and may include one or more working sets 322 for such processes.

Moreover, memory manager 304 may include one or more components that operate to perform operations for page swapping as described herein. In some embodiments, memory manager 304 includes page table 306 which maps a virtual address to each page's location either in physical memory or in the pagefile for paging operations. Some embodiments may further employ page table 306 to store information for the reserved locations of candidate pages in the swap file when candidate pages are swapped out of the working set for a process (as further described below with reference to FIG. 4A). In some embodiments, reservation of space in the swap file may proceed as described in U.S. patent application Ser. No. 13/042,128 titled "Pagefile Reservations" filed on Mar. 7, 2011 and incorporated by reference.

Memory manager 304 may also include modified list 308 and/or standby list 310. In some embodiments, after candidate pages have been outswapped from the working set and locations have been reserved for them in the swap file, at some point later those candidate pages may be removed from the working set and be placed on modified list 308 to be written by a writer (e.g., page writer 312). Then, as each page is written to swap file 320 the address information for the page may be moved from the modified list 308 to the standby list 310. In some embodiments, standby list 310 keeps track of pages that have not yet been removed from physical memory even though they have been written to the swap file. In such cases, if the process seeks to access these pages they can still be accessed directly in physical memory without being swapped back in. However, if memory manager 304 requires more pages of physical memory for other processes it may allocate those pages that are on the standby list. In some embodiments, memory manager 304 also includes page writer 312 that operates to write pages from working set(s) 322 to pagefile(s) 318 and/or swap file(s) 320 (e.g., swap out pages), and/or read pages back into working set(s) 322 (e.g., swap in pages).

Illustrative Processes

FIGS. 4A, 4B, 5, and 6 depict flowcharts showing example processes in accordance with various embodiments. The operations of these processes are illustrated in individual blocks and summarized with reference to those blocks. The processes are illustrated as logical flow graphs, each operation of which may represent one or more operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations may be combined in any order, subdivided into multiple sub-operations, and/or executed in parallel to implement the described processes.

Figure 4A:
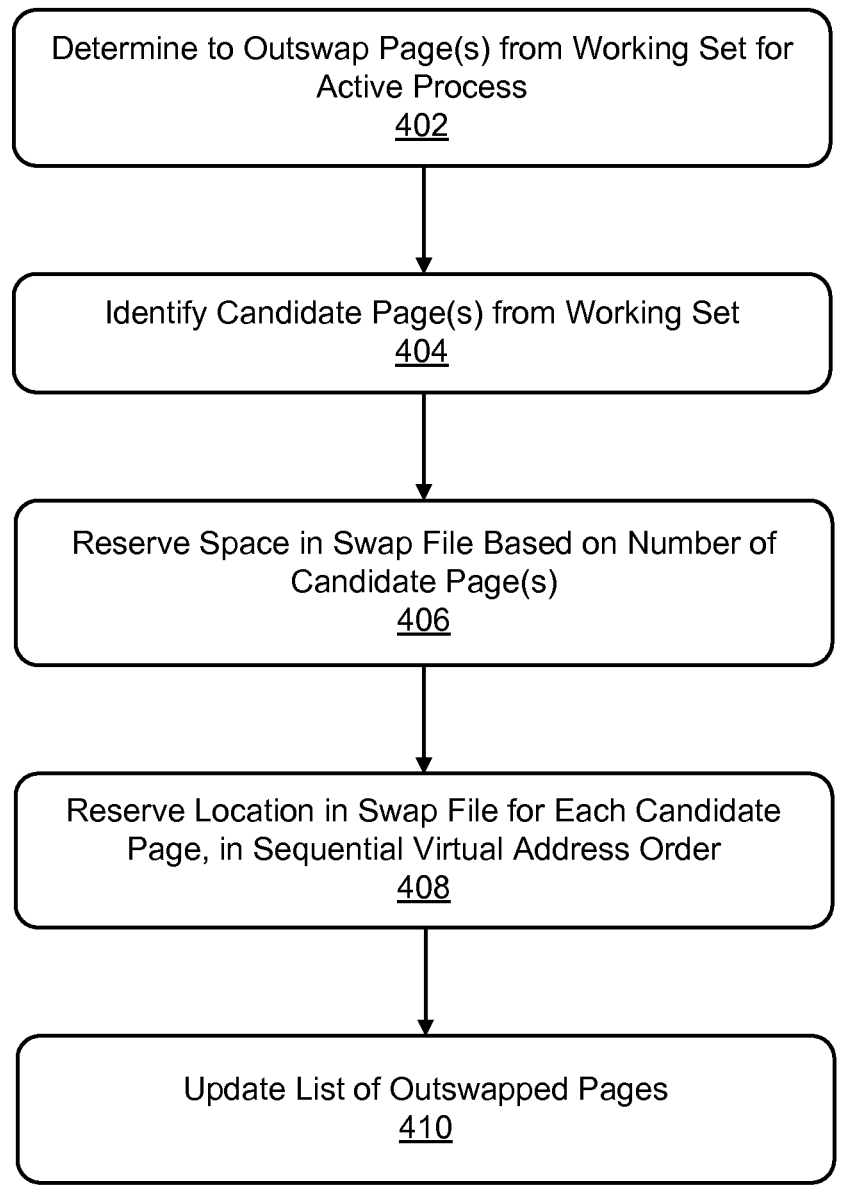
FIG. 4A depicts a flow diagram of an illustrative process for swapping out pages from a working set, in accordance with embodiments.

FIG. 4A depicts an example process for swapping out pages from a working set in accordance with embodiments. This outswapping process may be performed by one or more components of OS 208, such as memory manager 304 or policy manager 302. At 402 a decision is made to swap out one or more pages from a working set of a process into a swap file. In some embodiments, this decision may be made by policy manager 302 based on various criteria. In some cases, the decision to outswap may be based on a determination that a process is inactive or suspended, that one or more threads associated with the process have not been active for a certain time period, that the process has been in the background for a period of time, that the process has not used a certain number of pages during a period of time, or that the computing system as a whole has been suspended and/or is inactive.

Once the decision to outswap has been made, at 404 one or more candidate page(s) are identified for swapping from a working set of the process. In some embodiments, the memory manager will analyze each page of the working set and determine whether each page is a candidate for outswapping based on certain criteria. In some embodiments, candidates for outswapping may include the private pages and/or pagefile-backed shared pages in the working set. In some embodiments, candidate pages may be identified based on whether those pages are clean, i.e., pages that have been written to a pagefile but have not been modified since then, such that the current version of the page in physical memory is the same as the page in the pagefile. Dirty pages are those pages that may have been altered since being written to a pagefile, or that have not yet been written to a pagefile. Further, in some embodiments whether or not a page is locked in memory may be considered when deciding whether the page is a candidate for outswapping.

At 406 space is reserved in the swap file based on a calculated total size of the identified candidate pages (e.g., reserved space 106). At 408 a location is assigned or reserved in the reserved space of the swap file for each candidate page. In some embodiments, locations are reserved in virtual address order according to the virtual addresses of the candidate pages in the working set. Thus, even if the candidate pages are non-contiguous within the working set their locations in the swap file may be contiguous. Contiguous, sequentially ordered locations of the candidate pages in the reserved space of the swap file may enable future reads from the swap file to be performed in large, sequentially ordered blocks to provide efficient inswapping. In some embodiments, reservation of space in the swap file may proceed as described in U.S. patent application Ser. No. 13/042,128 titled "Pagefile Reservations" filed on Mar. 7, 2011 and incorporated by reference. Once locations for the candidate pages have been reserved at 408, those candidate pages may be said to have been outswapped. At 410 a list (or other data structure) of the outswapped candidate pages is updated. In some embodiments, this list is updated when the locations are reserved at 408.

Figure 4B:
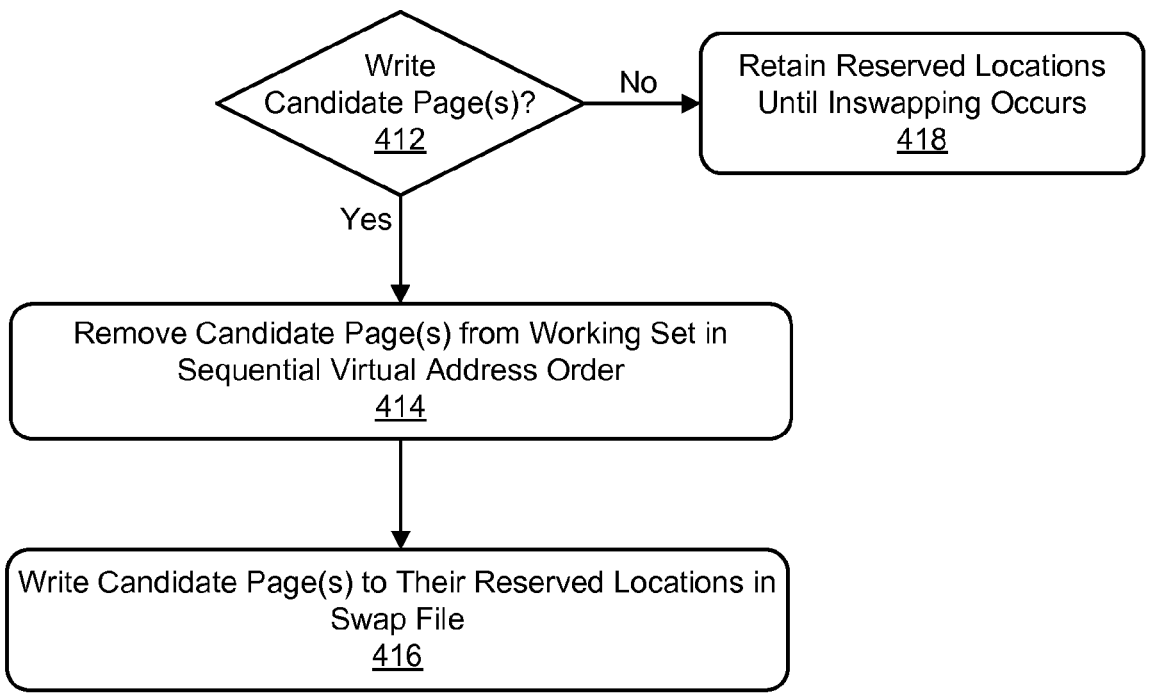
FIG. 4B depicts a flow diagram of an illustrative process for writing swapped out pages to a swap file, in accordance with embodiments.

Once the locations have been reserved and the list updated, at some later time the memory manager may choose to write some or all of the outswapped pages to their reserved locations in the swap file. FIG. 4B depicts an example process for writing outswapped pages according to embodiments. At 412 a decision is made to write one or more of the identified candidate pages to the swap file (e.g., to swap out the pages from the working set). In some embodiments, this decision may be made based on a determination that a certain threshold period of time has passed during which the criteria that led to the decision to outswap (at 402) are still valid. For example, a certain period of time (e.g., 5 minutes) may pass in which a process is still inactive or suspended. In some embodiments, the decision may be made based on a determination by the memory manager that more physical memory is needed for use by one or more active processes.

If the decision is made at 412 to write one or more candidate pages to the swap file, at 414 the one or more candidate pages to be written may be removed from the working set. In some embodiments, all of the candidate pages are removed and written to the swap file in one or more write operations. In some embodiments, a portion of the candidate pages are removed. In some embodiments, the candidate pages written may be determined based on pressure for memory (e.g., based on the memory manager's need for more physical memory). In some embodiments, the decision which candidate pages to outswap may be based on how recently those pages were accessed by the process. For example, the memory manager may choose to outswap those pages that are least recently used and that have not been accessed by the process within a certain period of time.

In some embodiments, removal of the candidate pages may be optimized by removing them from the working set in an order consistent with the order in which locations for the candidate pages were reserved in the swap file. For example, candidates may be removed from the working set in virtual address order, such as in cases where the locations were reserved in virtual address order. In some embodiments, removal of the candidate pages from the working set may be arbitrary and/or random (e.g., not ordered), although the candidate pages are still written into sequentially ordered locations in the swap file based on virtual address order. In some embodiments, pages may remain in the working set in physical memory (e.g., even after those pages are written to the swap file) until the memory manager needs to use those pages for active processes.

At 416 the candidate pages are written to the swap file. In some embodiments, the candidate pages are written to their reserved locations that are sequentially ordered in the swap file according to their virtual address order (e.g., in ascending or descending order according to the virtual addresses of the pages in the working set). Moreover, the writing operations themselves may be optimized and/or performed more efficiently by clustering the candidate pages to perform writes in as large of blocks of memory as possible, and/or by performing the write operations in sequential virtual address order. In some embodiments, page writer 312 performs the write operations to write candidate pages to their reserved locations in the swap file. In cases where the candidate pages have not been assigned a reserved location, pages may be written to the pagefile. In some embodiments, addresses of the written pages may be saved by the memory manager in a data structure to be used for reading in the pages from the swap file.

In some cases, the decision may be made at 412 to not write the swapped out pages. In such cases, at 418 the reserved locations may be retained until inswapping occurs (as described in FIG. 5). In some embodiments, the decision may be made to not write candidate pages to the swap file if the conditions that led to the initial decision to swap (e.g., at 402) are no longer present after a certain threshold period of time. For example, the process may be active again or may no longer be suspended. In other cases, a condition to inswap pages may occur before those candidate pages have been written to the swap file, for example if one or more of the candidate pages are accessed by the process (e.g., conditions that would lead to a page fault if those pages had been removed from physical memory).

Some embodiments support an optimization in which pages are removed from the working set over a period of time after the swap out decision has been made at 402. Further, groups of pages may be swapped out and/or written out to the page file according to usage patterns. For example, the memory manager may swap out and/or write a first group of pages that are the most recently accessed by the process (e.g., accessed within the last 5 seconds), then after a period of time swap out and/or write a second group of pages that are less recently accessed (e.g., accessed between the last 5 seconds and the last 10 seconds), and so forth. In some cases, such groups may instead be ordered from least recently accessed to most recently accessed. In some embodiments, swapping out and/or writing out of pages may be based on a particular activity or phase of the process executing. For example, an application may enter a particular phase or perform a particular behavior, and pages related to that phase or behavior (or not related to that phase or behavior) may be swapped out by the memory manager.

Moreover, embodiments support various combinations of optimizations. For example, groups of pages may be swapped out, and then similar groups or differently determined groups may be written to the swap file. As another example, a whole working set of pages may be swapped out, and then groups of pages are identified for writing to the swap file as described herein.

Moreover, in some embodiments the swapping out of one or more pages from the working set of a process may be described as saving a current state of the process to secondary storage, such that when the memory manager swaps in the swapped out pages the process is restored to the state it was in when, for example, it was suspended or became inactive. In some embodiments an executing process may seek to access pages that have been outswapped before they have been inswapped. In such cases the memory manager may determine to inswap all the outswapped pages, inswap those pages for which access is sought, and/or inswap one or more pages that are near to the requested page(s) in virtual address space. This may include releasing the reservation locations for the inswapped pages in the swap file.

Figure 5:
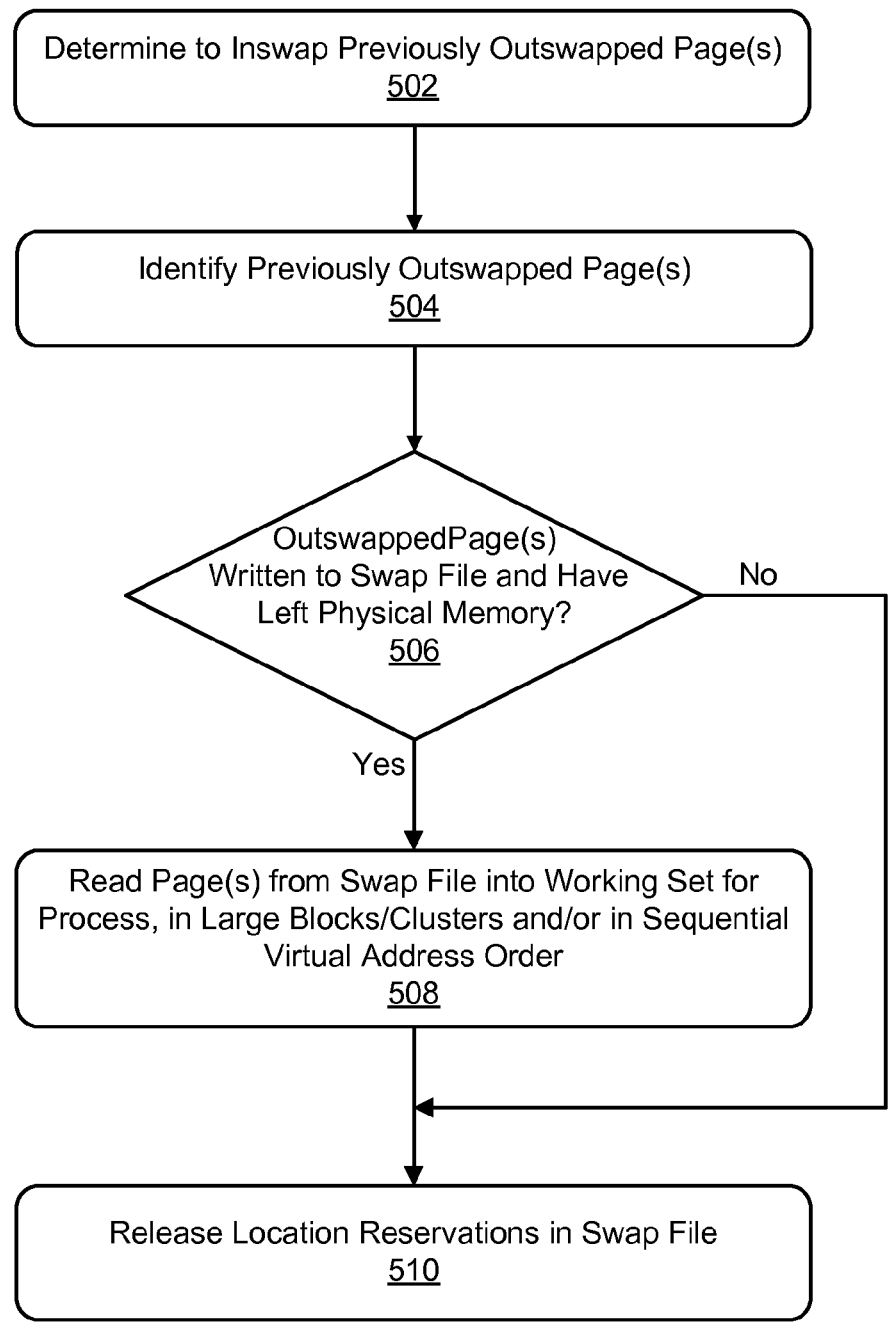
FIG. 5 depicts a flow diagram of an illustrative process for swapping in pages from a swap file to a working set, in accordance with embodiments.

FIG. 5 depicts an example process for swapping in pages from secondary storage to a process working set in physical memory, in accordance with embodiments. In some embodiments, the inswapping process is performed by one or more components of OS 208, such as memory manager 304 or policy manager 302. At 502 a decision or determination is made to swap in one or more pages that were previously outswapped from a working set for a process. In some embodiments, this decision is made by policy manager 302, and may be made based on various criteria. Such criteria may include receiving an indication that the process is no longer inactive or suspended, or that the process seeks to access one or more pages that are not in physical memory (e.g., a page fault has occurred). In some embodiments, criteria may include a cessation of those conditions that led to the decision to outswap at 402.

At 504 one or more previously outswapped pages are identified for inswapping. At the time the inswap decision is made at 502, one or more of the outswapped pages may no longer be in physical memory. For example, the memory manager may have used one or more outswapped pages for other processes. Thus at 504 identification of pages for inswapping may include determining those outswapped pages that are no longer in physical memory. In some embodiments, identification of pages for inswapping may be based on those pages whose addresses were saved in a data structure by the memory manager when they were outswapped. In some embodiments, failed access attempts by a process to one or more pages (e.g., page faults) may cause those pages to be inswapped.

At 506 a determination is made whether the one or pages identified as previously outswapped have been written to the swap file as described with regard to FIG. 4B above and whether the pages have left physical memory. In some embodiments, at 508 if the pages have been written to the swap file and have left physical memory, the pages identified for inswapping are read from their locations in the swap file back into the working set in physical memory. In some cases, pages may have been removed from the working set but have not left physical memory yet (e.g., if the pages were cached on the standby list). In such cases, these cached pages may be added back into the working set from the standby list and their reserved locations released, but there is no need to read the pages from the swap file. Further, some of the pages of the working set may have left physical memory after outswapping while other pages remain cached on the standby list. In such cases those pages that have left physical memory may be read from the swap file and, along with the cached pages, added back into the working set.

In some embodiments, this reading in of pages may proceed similarly to the reads issued when the process page faults. However, embodiments support reads in large blocks of memory and/or in sequential virtual address order which are therefore more efficient than reads of smaller blocks from arbitrary locations in secondary storage. For example, because the pages were written into a contiguous block reserved in the swap file (or in some cases, a number of contiguous blocks as described below) and were written in sequential virtual address order, clusters of multiple pages may then be read in large blocks and in sequential virtual address order, providing for more efficient read operations.

In some embodiments, it may be beneficial for system performance and/or usability that reading in of the outswapped pages be performed efficiently, given that a user may be waiting for a previously inactive or suspended process to become active again (e.g., such as when the process is a user application). Given that, some embodiments may support an optimization in which pages are read back into physical memory in an order that is based on how frequently accessed or how recently accessed they were prior to swapping out. For example, prior to swapping out pages from a working set the memory manager may keep track of which pages were more frequently accessed or more recently accessed by the process, and those pages may be swapped in earlier than other pages.

For example, a first group of pages may be determined to have been accessed within a certain time period (e.g., in the last 5 seconds prior to application suspension), a second group of pages may be determined to have been accessed within a next time period (e.g., between 5 and 10 seconds), a third group may be determined to have been accessed with a next time period (e.g., between 10 and 15 seconds), and so forth. Then, when the decision is made to swap in pages, the first group may be swapped in first, the second group may be swapped in after the first group, the third group may be swapped in after the second group, and so forth. Such an optimization may ensure that the process becomes at least partially active and more quickly usable by a user, given that those pages most recently accessed by the process prior to outswapping are the ones swapped in first.

Moreover, some embodiments may support an optimization in which memory management related to the working set is performed prior to the swap operation. For example, during the outswap process the memory manager may proactively "age" some or all of the working set so that a subset of pages in the working set is determined to be recent. This subset of pages may then be outswapped and/or written to the swap file. At inswap time this may achieve some optimization given that not all of the memory pages would have been swapped out and fewer pages may therefore need to be read from the swap file.

At 510 the reserved locations for the outswapped pages in the swap file are released. In some embodiments, release of the reserved locations may also be performed in cases where it is determined at 506 that the pages to be inswapped have not been written to their reserved locations in the swap file.

Figure 6:
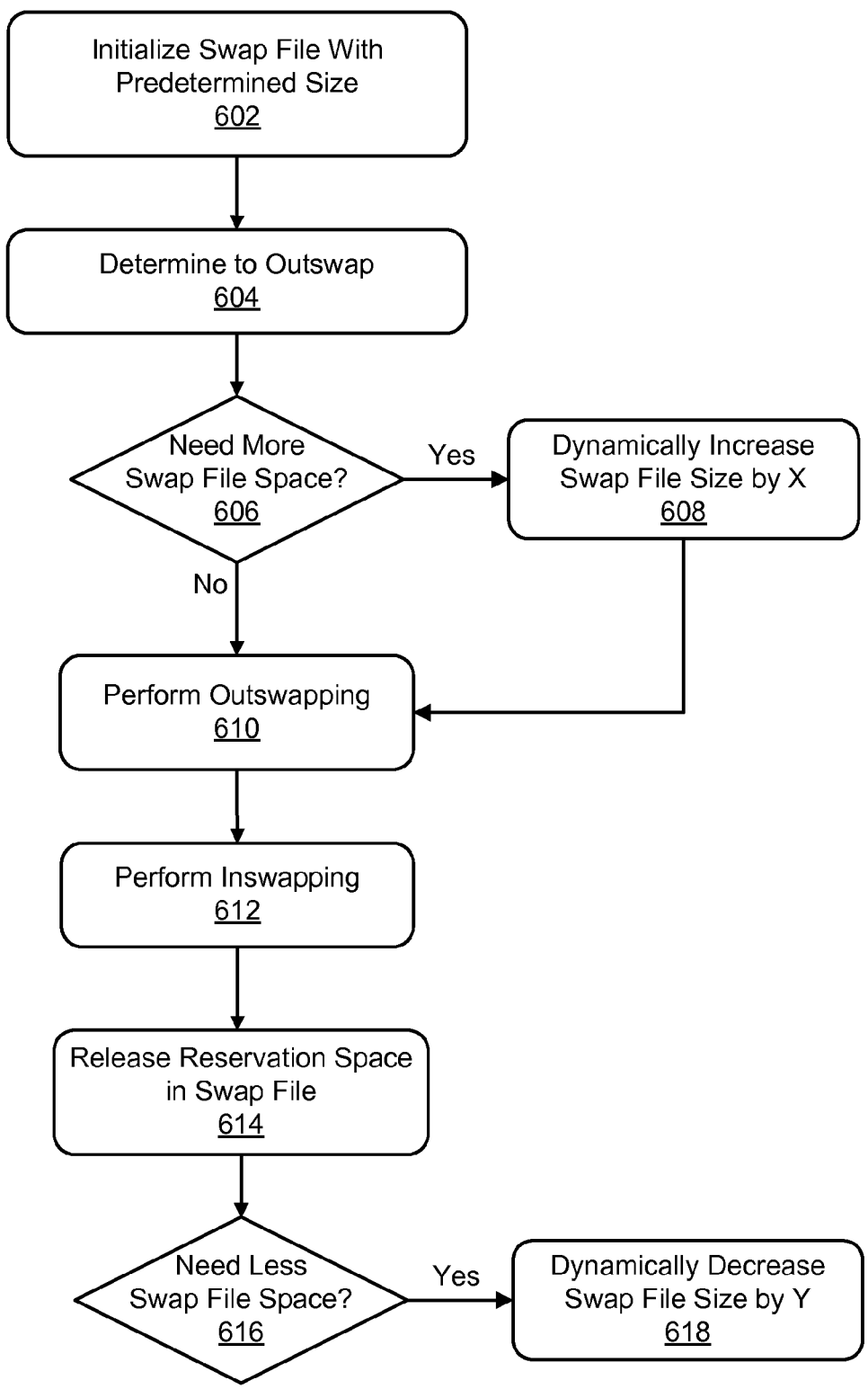
FIG. 6 depicts a flow diagram of an illustrative process for dynamically managing a swap file, in accordance with embodiments.

FIG. 6 depicts an example process for dynamically managing the swap file, according to embodiments. In some embodiments, this process is executed by a component of OS 208 such as memory manager 304. At 602 the swap file is initialized. In some embodiments, the swap file is initialized with a predetermined size (e.g., 256 MB) when the computing system boots. In other embodiments, the swap file is initialized when the memory manager determines that swapping operations are to occur, and may be initialized with an initial size sufficient to accommodate the pages to be swapped.

As the memory manager (or other OS component) operates, a determination may be made at 604 to outswap one or more pages from the working set of a process executing in physical memory, as described above with regard to FIG. 4A. At 606 a determination may then be made whether additional space is needed in the swap file to accommodate the outswapped pages if they are written to the swap file. If more space is needed, then the swap file size may be dynamically increased at 608. In some embodiments, the decision to increase the swap file size may be based on the memory manager receiving requests for page swapping that cannot be accommodated given the current size of the swap file. Moreover, some embodiments may provide for a maximum size of the swap file. In some embodiments, the initial size of the swap file and/or the dynamic changes in its size may be at least partly determined by the size and/or type of processes executing on the system.

At 610 outswapping operations and/or writing operations are performed as described above. At some point later a determination may be made at 612 to inswap one or more of the outswapped pages, and the reservation locations for one or more pages in the swap file are released at 614. Inswapping and the release of reservation locations may proceed as described above with regard to FIG. 5. At 616 a decision may be made that less space is needed for the swap file following, for example, the inswapping operations at 612 and release of reservation locations at 614. In such situations, the swap file size may be dynamically decreased at 618. In some embodiments, the decision to decrease the swap file size may be made based on a determination that the inswapping of pages for one or more processes reduced the need for swap file space. In some embodiments, free space in the swap file may be reused for subsequent writes of outswapped pages by the memory manager, and the memory manager may reuse swap file space in a manner that minimizes fragmentation (e.g., such that pages are preferably saved in larger, more contiguous blocks and/or in sequential virtual address order).

Because embodiments seek to perform swap operations in large reads and writes of sequentially order clusters of pages, it may be advantageous for the swap file itself to be less fragmented and more contiguous in secondary storage. To that end, in some embodiments when the memory manager determines that more swap file space is needed it may request additional space from the operating system in a certain block size (e.g., 128 MB) that is larger than the amount by which the swap file shrinks (e.g., 64 MB). By requesting additional space in larger blocks, embodiments may reduce the possibility of external fragmentation of the swap file given that the file system attempts to find the requested additional swap file space in contiguous space (or fewer contiguous blocks of space) in the secondary storage.

Moreover, given the desirability of a contiguous swap file, embodiments employ a swap file that is separate from the pagefile as shown in FIG. 3. Using a separate, dedicated swap file may increase the possibility that the swap file is created and/or expanded as a single contiguous block (or fewer contiguous blocks). Although some embodiments support the use of the pagefile for the swapping operations described herein, such a scenario may increase the possibility that the swap file may become externally fragmented and therefore less amenable to large, sequential I/O operations given the arbitrary and non-contiguous manner of traditional paging methods that employ the pagefile. Embodiments therefore support the use of a separate, dedicated swap file to increase efficiency of I/O operations given the increased chance for larger, more sequential I/O operations from using a separate swap file.

Further, embodiments may support a swap file that is separate but non-contiguous, distributed among a certain number of segments in secondary storage. Some embodiments may support a maximum number of such segments (e.g., five) to ensure that the swap file is not overly non-contiguous. In some embodiments, a single swap file may be employed for swapping pages from all processes on the computing system. In other embodiments, separate swap files may be used for individual processes or for groups of processes on the computing system.

CONCLUSION

Although the techniques have been described in language specific to structural features and/or methodological acts, it is to be understood that the appended claims are not necessarily limited to the specific features or acts described. Rather, the specific features and acts are disclosed as example implementations of such techniques.

What is claimed is:

1. A computer-implemented method comprising:
   identifying one or more candidate pages for swapping from a working set of pages for a process;
   reserving space in a swap file in secondary storage, the reserved space corresponding to a total size of the one or more candidate pages; and
   writing one or more of the candidate pages into sequentially ordered locations in the reserved space in the swap file.

2. The method of claim 1, wherein the one or more candidate pages written include all of the identified candidate pages.

3. The method of claim 1, wherein the one or more candidate pages written include candidate pages that have not been accessed by the process within a predetermined time period.

4. The method of claim 1, further comprising removing the one or more candidate pages to be written from the working set in sequential address order.

5. The method of claim 1, wherein the sequentially ordered locations are assigned to the one or more candidate pages contiguously and in sequential virtual address order.

6. The method of claim 1, wherein the writing of the one or more of the candidate pages is performed sequentially in virtual address order.

7. The method of claim 1, wherein the identified one or more candidate pages are private pages for the process.

8. The method of claim 1, further comprising reading a cluster of at least some of the written candidate pages from the reserved space in the swap file into the working set for the process in sequential address order.

9. A system comprising:
   at least one processor;
   a memory; and
   a memory manager that is executed by the at least one processor and that operates to:
      identify one or more candidate pages for swapping from a working set of pages for a process executing in the memory;
      reserve space in a swap file in secondary storage of the system, the reserved space corresponding to a total size of the one or more candidate pages; and write one or more of the candidate pages into sequentially ordered locations in the reserved space in the swap file.

10. The system of claim 9, wherein the one or more candidate pages written includes all of the identified candidate pages.

11. The system of claim 9, wherein the one or more candidate pages written includes candidate pages that have not been accessed by the process within a predetermined time period.

12. The system of claim 9, further comprising a policy manager that is executed by the at least one processor and that determines to swap at least a portion of the working set for the process, based on a detected state of the process.

13. The system of claim 12, wherein the detected state is at least one of a suspended or an inactive state of the process.

14. The system of claim 9, wherein the memory manager further operates to read the one or more written candidate pages from the reserved space in the swap file into the working set for the process in sequential address order.

15. One or more computer-readable storage media storing instructions that, when executed by at least one processor, instruct the at least one processor to perform actions comprising:

identifying one or more candidate pages for swapping from a working set of pages for a process;

reserving space in a swap file in secondary storage, the reserved space corresponding to a total size of the one or more candidate pages;

writing each of one or more of the candidate pages into a reserved location in the reserved space in the swap file, the reserved locations being in a sequential address order; and reading a cluster of at least some of the written candidate pages from the reserved space in the swap file into the working set for the process in sequential address order.

16. The one or more computer-readable storage media of claim 15, wherein the actions further comprise reserving the locations contiguously in the swap file.

17. The one or more computer-readable storage media of claim 15, wherein the locations for each of the one or more candidate pages are reserved according to an order of the one or more candidate pages in the working set.

18. The one or more computer-readable storage media of claim 15, wherein the swap file is employed for swapping pages from a plurality of processes that include the process.

19. The one or more computer-readable storage media of claim 15, wherein the swap file is dedicated to swapping pages for the process.

20. The one or more computer-readable storage media of claim 15, wherein the actions further comprise removing the one or more candidate pages to be written from the working set in sequential address order.

* * * * *